US011323268B2

(12) United States Patent
Ghosh et al.

(10) Patent No.: US 11,323,268 B2
(45) Date of Patent: May 3, 2022

(54) DIGITAL SIGNATURE VERIFICATION ENGINE FOR RECONFIGURABLE CIRCUIT DEVICES

(71) Applicant: Intel Corporation, Santa Clara, CA (US)

(72) Inventors: Santosh Ghosh, Hillsboro, OR (US); Manoj Sastry, Portland, OR (US); Prakash Iyer, Portland, OR (US); Ting Lu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 16/456,368

(22) Filed: Jun. 28, 2019

(65) Prior Publication Data

US 2019/0319805 A1 Oct. 17, 2019

(51) Int. Cl.
*H04L 9/32* (2006.01)
*H04L 9/30* (2006.01)
*H04L 9/06* (2006.01)
*G06F 7/72* (2006.01)

(52) U.S. Cl.
CPC ............ *H04L 9/3247* (2013.01); *G06F 7/725* (2013.01); *H04L 9/0643* (2013.01); *H04L 9/3066* (2013.01); *H04L 9/3234* (2013.01); *H04L 9/3236* (2013.01); *H04L 9/3252* (2013.01)

(58) Field of Classification Search
CPC .................................................... H04L 9/3247
See application file for complete search history.

(56) References Cited

U.S. PATENT DOCUMENTS

| 4,322,846 A | * | 3/1982 | Carroll | G06F 11/2736 |
| | | | | 714/46 |
| 6,675,337 B1 | * | 1/2004 | Tung | G01R 31/318342 |
| | | | | 714/733 |
| 9,985,661 B1 | | 5/2018 | Wang | |
| 2017/0328951 A1 | * | 11/2017 | Liew | G01R 31/3177 |
| 2019/0044718 A1 | | 2/2019 | Ghosh | |

FOREIGN PATENT DOCUMENTS

| CN | 103049710 A | * | 4/2013 |
| CN | 112152811 A | | 12/2020 |
| EP | 3758288 A | | 12/2021 |

OTHER PUBLICATIONS

Extended European Search Report for EP Application No. 20164798. 9, dated Jul. 30, 2020, 9 pages.

(Continued)

*Primary Examiner* — Bradley W Holder
(74) *Attorney, Agent, or Firm* — Jaffery Watson Mendonsa & Hamilton LLP

(57) ABSTRACT

Embodiments are directed to a digital signature verification engine for reconfigurable circuit devices. An embodiment of an apparatus includes one or more processors; and a reconfigurable circuit device, the reconfigurable circuit device including digital signal processing (DSP) blocks and logic elements (LEs), wherein the one or more processors are to configure the reconfigurable circuit device to operate as a signature verification engine for a bit stream, the signature verification engine including a hybrid multiplication unit, the hybrid multiplication unit combining a set of LEs and a set of the DSPs to multiply operands for signature verification.

19 Claims, 10 Drawing Sheets

(56) References Cited

OTHER PUBLICATIONS

Xilinx: "Virtex-5 Family Overview", Aug. 21, 2015, XP055716249, Retrieved from the Internet: URL:https://www.xilinx.com/support/documentation/data_sheets/ds100.pdf, 15 pages.
Andrzejczak Michal: "An Improved Architecture of a Hardware Accelerator for Factoring Integers with Elliptic Curve Method", 2018 Federated Conference on Computer Science and Information Systems (FEDCSIS), Polish Information Processing Society, Sep. 9, 2018 (Sep. 9, 2018), pp. 363-368, XP033429922.
Communication pursuant to Article 94(3) EPC in EP Application No. 20 164 798.9, dated Dec. 23, 2021, 6 pages.

* cited by examiner

One-Time Hash-Based Signatures

A private key must only sign a single message

Multi-Time Hash-Based Signatures

A private key can sign multiple messages

WOTS One-Time Signature Scheme
Message is hashed and parsed into M:67 integers between [0,1,2,...15]

- 205 Public Key pk: 67 components of 32-bytes each
- 210 Signature s: 67 components of 32-bytes each
- 215 Public Key pk: 67 components of 32-bytes each

DIGITAL SIGNATURE VERIFICATION ENGINE FOR RECONFIGURABLE CIRCUIT DEVICES

TECHNICAL FIELD

Embodiments described herein generally relate to the field of electronic devices and, more particularly, a digital signature verification engine for reconfigurable circuit devices.

BACKGROUND

Reconfigurable circuit devices, such as FPGAs (Field Programmable Gate Arrays) and CPLDs (Complex Programmable Logic Devices), are increasingly being deployed in enterprise, cloud and telecommunication networks to accelerate different application specific workloads, such as machine learning, network functions virtualization (NFV), financial applications, and others. As these accelerators are inside the cloud computing boundary, authenticity of these accelerators are of utmost important to preserve the integrity of the cloud system. Authentication may be provided with digital signature verification, including use of ECDSA (Elliptic Curve Digital Signature Algorithm).

Pre-generated bitstreams are loaded on a reconfigurable circuit device to instantiate an accelerator using a flat image model or via partial reconfiguration of application functional units (AFU). Authenticity of an accelerator on a reconfigurable circuit device as a trusted compute boundary (TCB) can be achieved through a cryptographically secure signature of the bitstream, which can then be verified before loading on the device. However, conventional devices do not include bitstream authentication mechanisms, and thus are highly exploitable by network-based attackers. Such vulnerabilities will become even more concerning in light of expected new attacks utilizing advanced technologies such as quantum computing.

ECDSA is a widely used public-key scheme that may be applied to provide protection against attacks. However, this technology is highly hardware area intensive, thus creating significant challenges for implementation in reconfigurable circuit devices. For example, existing ECDSA technology may requires 86k logic elements (LE) in an FPGA, which creates a major bottleneck for deploying bitstream authentication.

Thus, what is needed is a lightweight technology for bitstream authentication in a reconfigurable circuit device that provides acceptable latency and performance to combat attacks.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
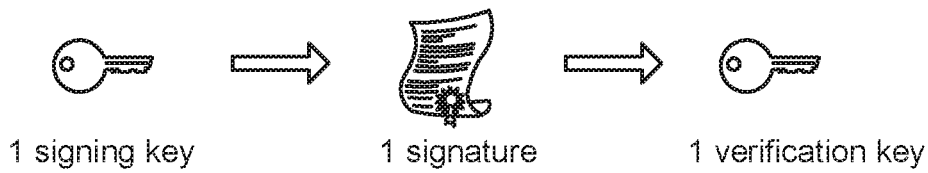
FIGS. 1A and 1B illustrate a one-time hash-based signatures scheme and a multi-time hash-based signatures scheme, respectively.

Embodiments described herein are directed to a digital signature verification engine for reconfigurable circuit devices.

In some embodiments, an apparatus, system, or process utilizes a lightweight digital signature verification engine, such as an ECDSA engine, for implementation in an FPGA, CPLD (Complex Programmable Logic Device), or other reconfigurable circuit device. Existing ECDSA engines were designed for ASICs (Application-Specific Integrated Circuit), with specific features like technology node independence and the need to be fully synthesizable. When such a design is mapped to an FPGA device (such as, for example, an Intel® MAX® 10 FPGA device), all of the internal components for the engine are conventionally implemented in LEs, which results in ~86k of LE (Logic Element)) utilization. An LE is a smallest logic unit in an FPGA, wherein a logic array block (or logic block) includes a certain number (such as 16) of LEs in addition to other elements). The required LE count to implement an ECDSA engine is not acceptable because this would necessitate utilizing a great majority of the LEs within a device, which may include all but 16k of the total available LEs in a smaller MAX 10 device, with these remaining LEs to be shared among cryptographic and other operations (e.g., telemetry, VR sequencing FSM, PLDM/MCTP protocol handler). This would require significant resources even in a larger FGPA device. Thus, the area requirements for existing technologies are impractical for resource constrained FPGA products.

In some embodiments, to address this issue, a novel lightweight digital signature verification engine is provided for utilization in constrained reconfigurable circuit devices such as CPLDs and FPGAs. The most critical operation in ECDSA is multiplication on large (as large as 384-bit) integers. In some embodiments, to optimize the LE utilization within a reconfigurable circuit device, a hybrid design technology combining dedicated and configurable elements is provided for performing large multiplication operations, such as a 384-bit×384-bit multiplication.

A reconfigurable circuit device commonly includes dedicated multiplier circuits within the device. For example, there are 9-bit×9-bit built-in multiplier circuits within a MAX10 FPGA. However, as one such small multiplier can compute only a fraction of a full 384-bit×384-bit multiplication operation. In some embodiments, multiple built-in multiplier circuits of a reconfigurable circuit device are combined with a set of LEs of the reconfigurable circuit device to generate a hybrid multiplication circuit to address large multiplication operations.

However, the generation of a full multiplication circuit for signature verification in a reconfigurable circuit device is not practical because of the extreme area requirements. For this reason, the hybrid multiplication circuit is designed to perform a portion of the required multiplication, with the hybrid multiplication circuit being applied iteratively to generate the final multiplication result. This allows for both practical implementation and reasonable performance. In a particular implementation of a hybrid multiplication circuit to achieve an optimal LE utilization, a 384-bit×9-bit combinatorial multiplier is created utilizing 43 small dedicated multipliers. The 384-bit×9-bit multiplier is then applied iteratively 43 times to compute the complete 384-bit×384-bit multiplication operation.

In some embodiments, the LE requirements for ECDSA operations in a reconfigurable circuit device are further reduced by utilizing embedded memory of the reconfigurable circuit device to provide the registers that are required for holding intermediate results during ECDSA operations. Application of this technology significantly reduces the need for LE registers in ECDSA operation. The embedded memory may be internal BRAMs (Block RAMs) of an FPGA, or other memory that is embedded within a reconfigurable circuit device.

Through the application of this hybrid technology, a resulting ECDSA design may be effectively mapped into a utilization constrained device with greatly reduced LE requirements in comparison with conventional technology. In an example, mapping a hybrid multiplication circuit into a MAX10 device may be accomplished while requiring as little as 4.2k LE (21× smaller compared to the existing engine), and would meets the LE utilization requirement for bitstream authentication. Latency of ECDSA verify utilizing this hybrid engine will be 23 ms @50 Mhz speed.

The optimizations made in a device to provide the integer multiplier and the overall ECDSA engine with low LE requirements also serve to reduce ALM (Adaptive Logic Module) utilizations for the device. Additionally, the integer adder circuit inside the ECDSA engine can be implemented by utilizing the underlying adder blocks which further reduces the ALM utilizations. With regard to bitstream load/configuration time, the smaller utilization also serves to reduces the load time required for operations.

Post-Quantum Cryptography

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Shor, P. W. "Algorithms for quantum computation: discrete logarithms and factoring". Proceedings 35th Annual Symposium on Foundations of Computer Science. IEEE Comput. Soc. Press. doi:10.1109/sfcs.1994.365700. ISBN 0818665807. Although any post-quantum cryptography could be built on the current cryptography, the novel approach would need to be intelligent, fast, and precise enough to resist and defeat any attacks by quantum computers.

Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's Hidden Field Equation (HFE) public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance, such as hash-based signatures (HBS).

Figure 1B:
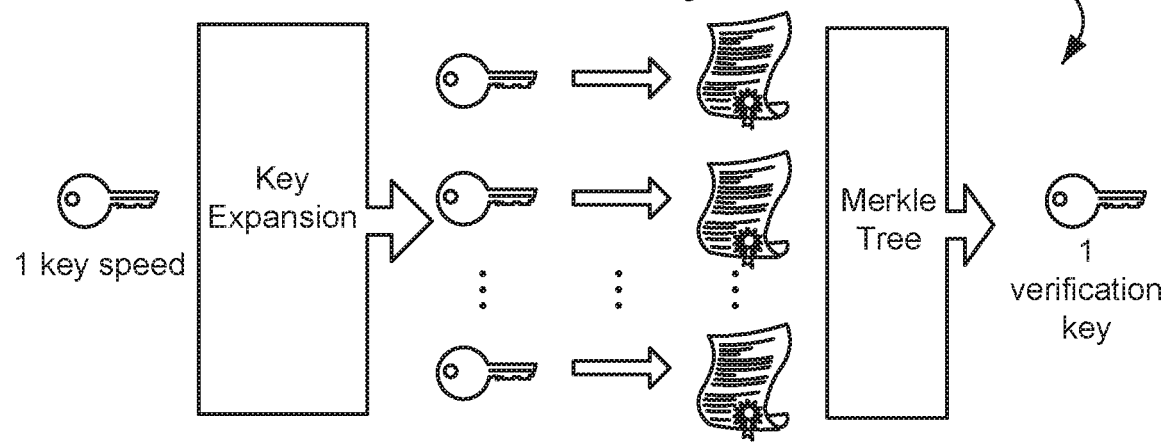

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), SPHINCS scheme, SPHINCS+ scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform secured-boot, which is regarded as the most resistant to quantum attacks.

For example, as illustrated with respect to FIG. 1A, a scheme of HBS is shown that uses Merkle trees along with one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
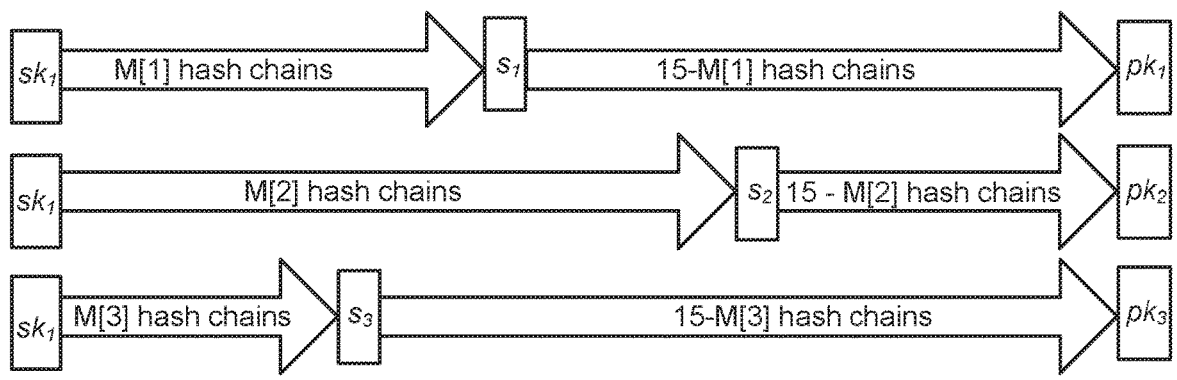
FIGS. 2A and 2B illustrate a one-time signature scheme and a multi-time signature scheme, respectively.
Figure 2A:
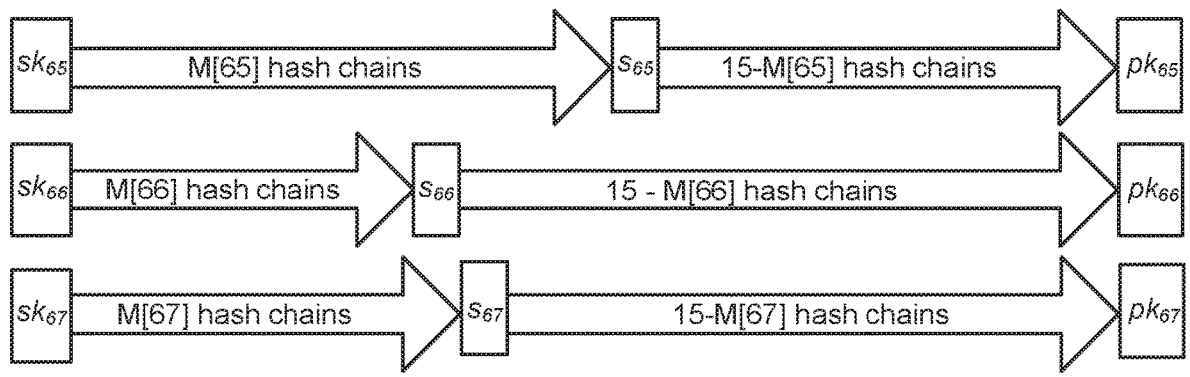
Figure 2B:
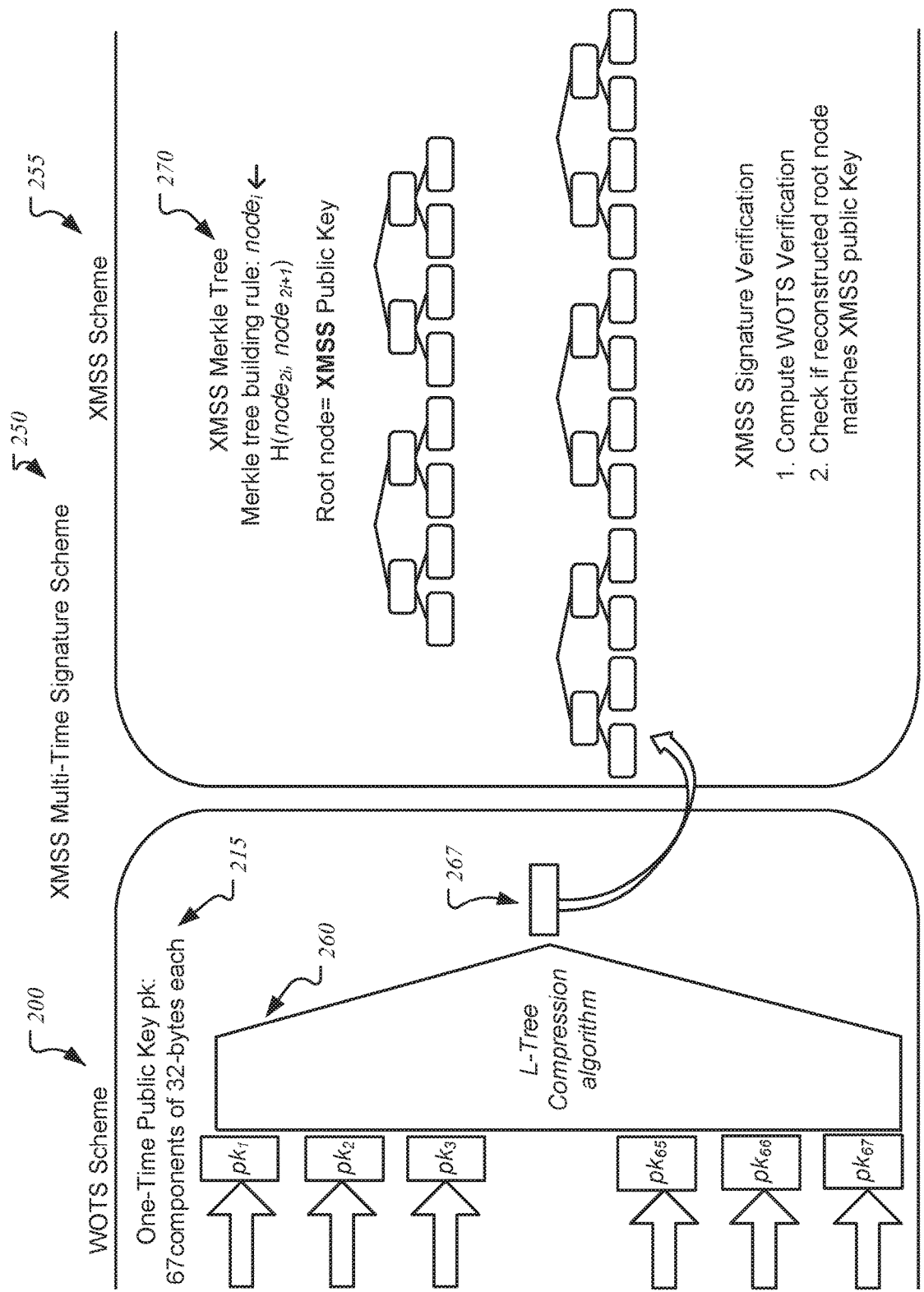

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS (WOTS) scheme 200, which was offered by Robert Winternitz of Stanford Mathematics Department, while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

Now, for example, FIG. 2B illustrates XMSS MTS scheme 250 that allows for a combination of WOTS scheme 200 of FIG. 2A and XMSS scheme 255 having XMSS Merkle tree 270. As discussed previously with respect to FIG. 2A, WOTS scheme 200 is based on a one-time public key, pk, 215, having 67 components of 32 bytes each, that is then put through L-Tree compression algorithm 260 to offer WOTS compressed pk 267 to take a place in the XMSS Merkle tree 270 of XMSS scheme 255. It is contemplated that XMSS signature verification may include computing WOTS verification and checking to determine whether a reconstructed root node matches the XMSS public key, such as root node=XMSS public key.

Ultra-lightweight ECDSA for FPGA Bitstream Authentication

Figure 3:
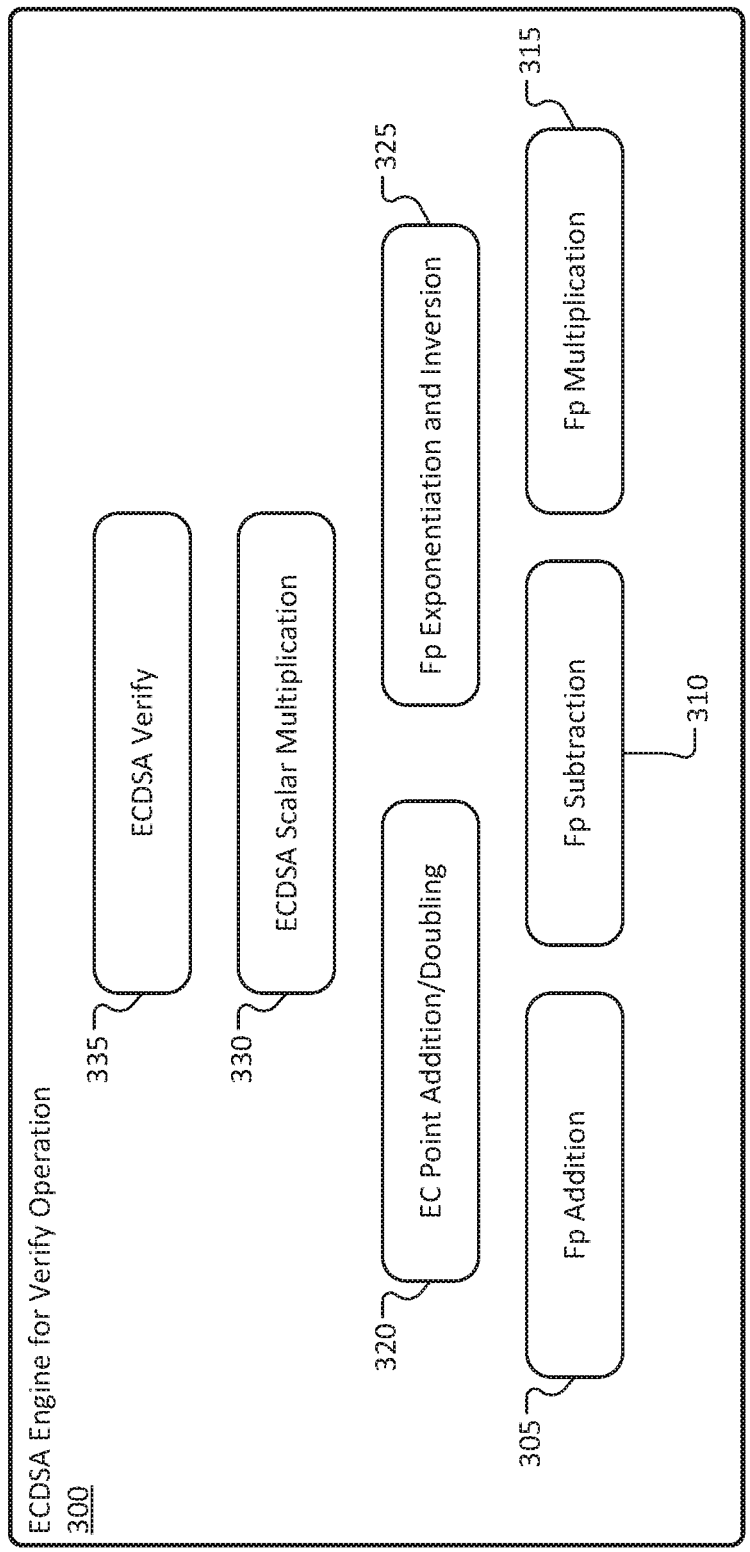
FIG. 3 illustrates a computation hierarchy for an ECDSA verify operation performed by an ECDSA hardware engine in a reconfigurable circuit device according to some embodiments.

FIG. 3 illustrates a computation hierarchy for an ECDSA verify operation performed by an ECDSA hardware engine in a reconfigurable circuit device according to some embodiments. As illustrated in FIG. 3, an ECDSA engine 300 for implementation in a reconfigurable circuit device for a signature verify operation includes the following computation hierarchy:

Galois Field over large prime modulus (Fp): A layer at the bottom of the ECDSA engine 300 computation hierarchy consists of underlying arithmetic and logic units that are capable of operating on up to 384-bit numbers for ECDSA-P384, the logic elements being Fp addition 305, Fp subtraction 310, and Fp multiplication 315. Among these, Fp multiplication 315 is the most area and time critical operation, and hence is also a significant contributor to the total area and latency impact of the ECDSA

IP.

Elliptic Curve (EC) point addition/doubling and Fp exponentiation inversion: EC point addition and doubling 320 and Fp exponentiation inversion 325 operations are based on a set of Fp operations. The hardware utilized for this block includes a sequencer/state-machine to pick Fp-operations in sequence, a set of multiplexers (MUXs) to feed respective operands to input of the Fp units, and a set of demultiplexers (DMUXs) for restoring intermediate results to appropriate storage elements.

EC scalar multiplication: EC scalar multiplication 330 is a one-way function that operates on a 384-bit integer and a point (x, y) on the 384-bit elliptic curve that provides the security of the ECDSA technology. It is based on a set of EC point addition and EC point doubling operations. The hardware utilized for this block includes a sequencer/state-machine to pick EC point operations in sequence, a set of MUXs to feed respective operands to input of the EC point addition/doubling unit, and a set of DMUXs for restoring intermediate results to appropriate storage elements.

ECDSA Verify: The ECDSA verify 335 layer consists of one Fp inversion and two EC scalar multiplications. Therefore, the hardware utilized for this layer primarily consists of a set of storage elements, a sequencer/state-machine, MUXs, and DMUXs in between local storage and next lower layer units.

Figure 4A:
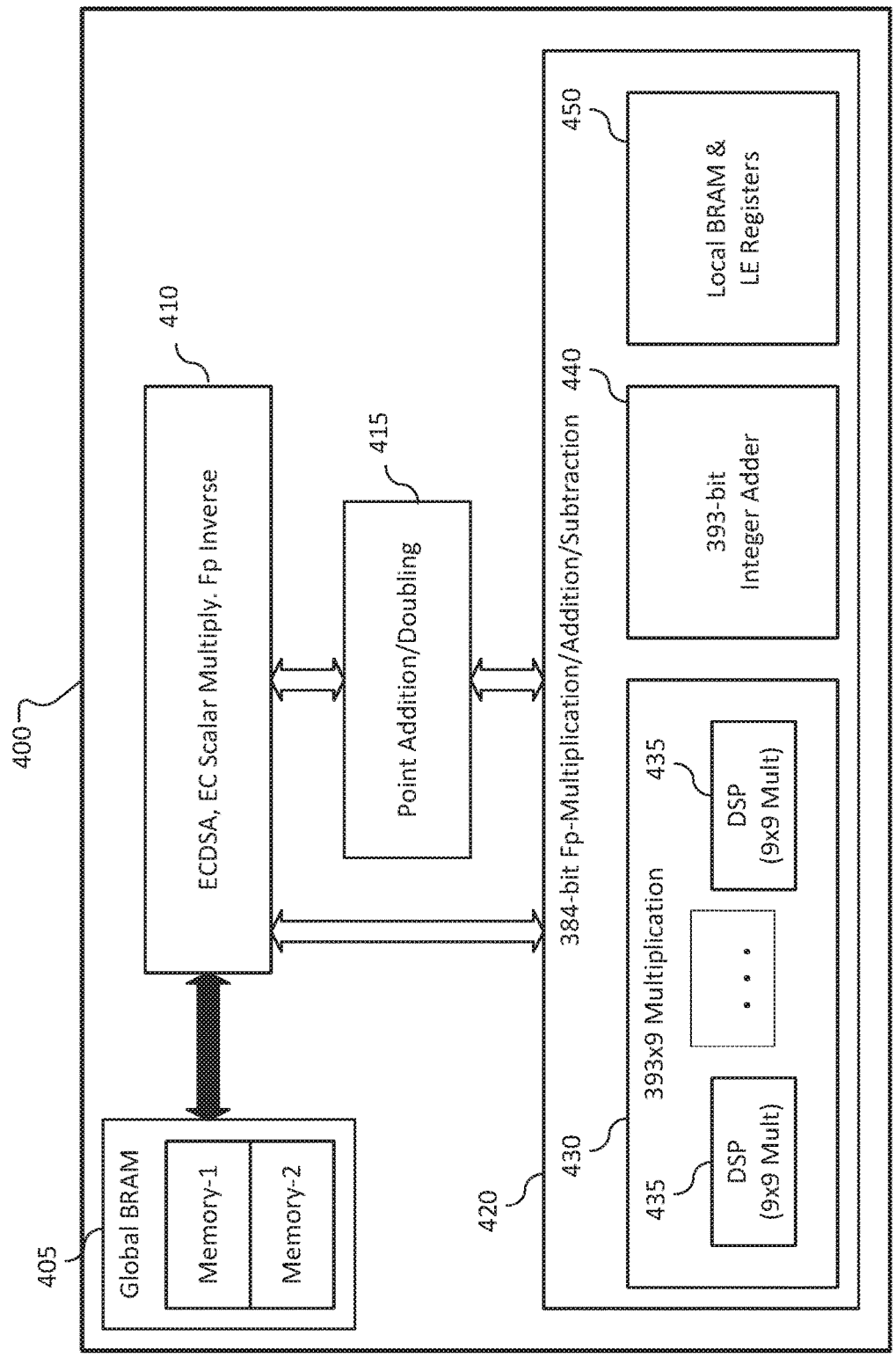
FIG. 4A illustrates a lightweight digital signature verify engine for reconfigurable circuit devices according to some embodiments.

FIG. 4A illustrates a lightweight digital signature verify engine for reconfigurable circuit devices according to some embodiments. In some embodiments, as illustrated in FIG. 4A, a digital signature verify engine 400 for an FPGA or other reconfigurable circuit device includes the following:

FPGA Block RAMs 405. In a particular implementation, a memory is defined with 31 locations with word size=ECDSA bit length (e.g., 256-bit, 384-bit). The memory reduces the LE count requirements as the storage required for temporary results are stored inside the BRAM based memory. The selected word length helps to reduce the memory read cycles by allowing the reading of one full ECDSA operand from the memory at a time. Additionally, compared to a simple single memory block, the memory block is duplicated (as Memory-1 and Memory-2 in the global BRAM 405) and the duplicated memory blocks are to be updated in parallel. For any specific operations, two operands are fetched in parallel from Memory-1 and Memory-2, which saves additional memory-read cycles as well as eliminating the need for an additional LE register to hold the first operand.

Minimal LE Based Galois Field (Fp) Multiplication, Addition and Subtraction unit 420: There are commonly multiple built-in Digital Signal Processing (DSP) blocks within FPGA and CPLD devices. For example, there are 288 DSP blocks in a MAX10 FPGA, where each DSP block has one 9×9 integer multiplier circuit. For ECDSA on a 384-bit Galois Field, it is necessary to compute 384×384 multiplication operations. A simple approach could use [384/9*384/9]=1849 (being 43*43) such 9×9 multipliers for designing a combinatorial 384×384 multiplier circuit. However, this number of DSP blocks would not be available in most smaller FPGA devices, and this would require a significant number of LEs as well for combining 18-bit intermediate results of each 9×9 multipliers to deliver the 768-bit final result of the 384×384 multiplication operation. Alternatively, a single 9×9 multiplier circuit in theory could be used iteratively to compute 384×384 multiplications, but is impractical because it would result in an unacceptably high latency for signature verification.

In some embodiments, a 393×9-bit combinatorial multiplier circuit 430 uses 43 DSP blocks (9×9 multipliers) 435. For combining 9×9 multiplier results to the output of a 393×9 multiplication, this design implementation requires as few as 395 LEs, which is the same as the number of LEs required for implementing a 384-bit adder circuit. However, compared to adder logic, this multiplier circuit provides a 9× speedup for a 384-bit integer multiplication.

In some embodiments, in addition a dedicated 393-bit adder circuit 440 is included for integer/Fp additions and subtractions. Further, the same adder circuit is shared for computing the Barrett reduction on 768-bit results of 384×384 multiplication operations. In some embodiments, local BRAM and a small number of LE registers 450 are used to store the intermediate results of Fp operations.

Point addition and point doubling unit 415: In some embodiments, a unit 415 is to compute elliptic curve group operations (point addition and point doubling). The point addition and doubling unit 415 is a state machine that schedules the underlying Fp operations sequentially. Scheduling an operation to the Fp-Multiplication/Addition/Subtraction unit 420 includes the following:

a) read operands from the Global BRAM, b) generate appropriate opcode, and c) store the result into the correct location in the Global BRAM.

To reduce the LE requirements for an implementation, there is no local storage required inside the point addition and point doubling unit 415. In other words, the point addition and point doubling unit 415 does not copy any operands inside the unit. Instead, the unit 415 redirects the operands and results between the Global BRAM 405 and the Fp-Multiplication/Addition/Subtraction unit 420. This saves not only register/storage requirements but also MUX logic that is utilized to implement the inputs and outputs.

ECDSA EC scalar multiplication and Fp inverse unit 410: In some embodiments, the unit 410 is also based on the state machine for executing the ECDSA Sign/Verify, the EC scalar multiplication, and the Fp-inverse operations. The unit 410 includes one additional 384-bit register to store the scalar/exponent for EC scalar multiplication and Fp inverse operations. For any specific operation the unit 410 follows an execution flow as illustrated in the flow chart provided in FIG. 5.

Figure 4B:
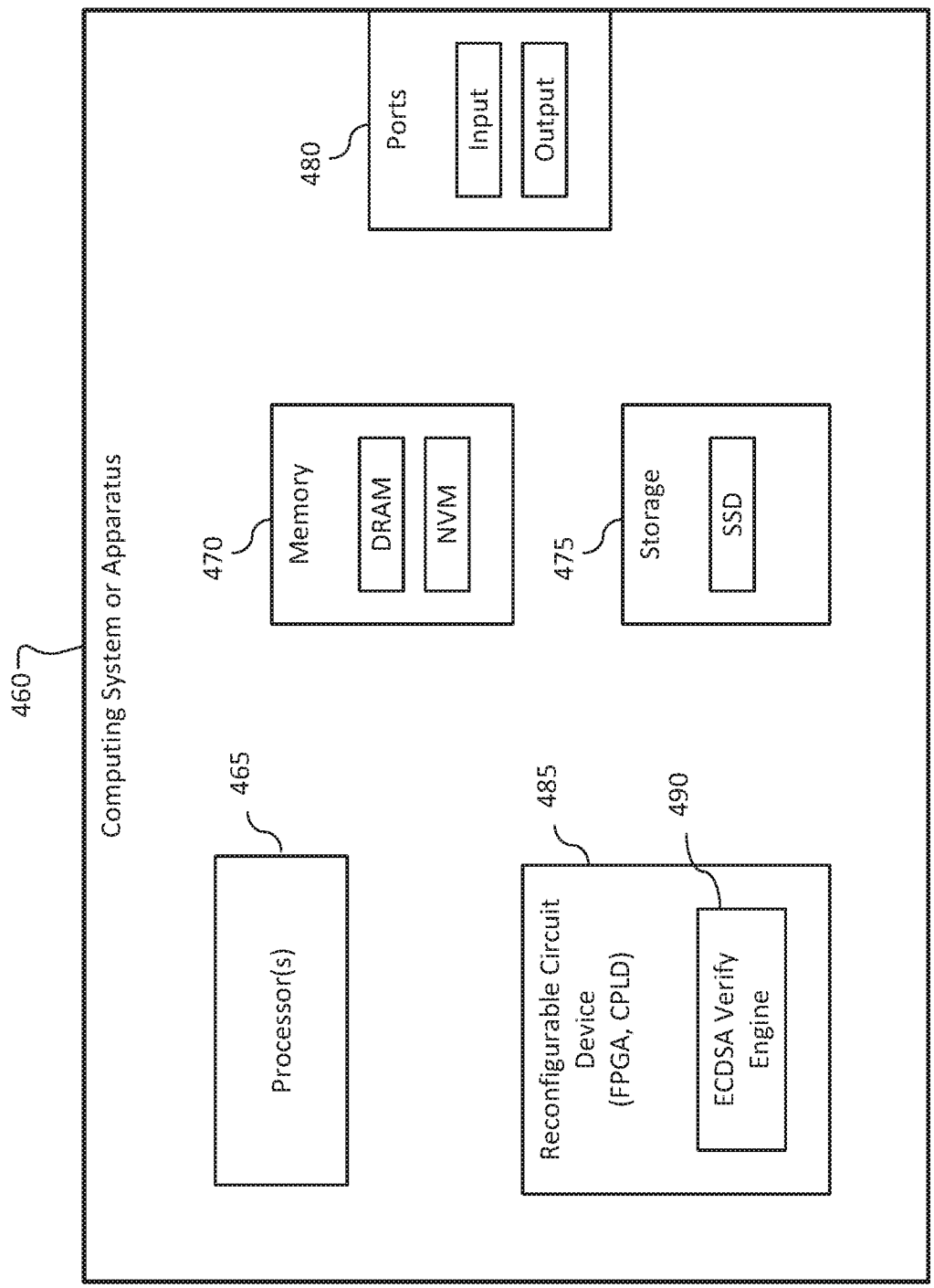
FIG. 4B illustrates a computing system or apparatus including a reconfigurable circuit device for configuration as a digital signature verify engine according to some embodiments.

FIG. 4B illustrates a computing system or apparatus including a reconfigurable circuit device for configuration as a digital signature verify engine according to some embodiments. In some embodiments, a computing system or apparatus 460 includes one or more processors 465; memory 470 to hold data, which may include volatile memory such as a dynamic random access memory (DRAM) and non-volatile memory (NVM) such as flash memory; storage 475 for data, such as a solid state drive (SSD), hard drive, or other storage device; and one or more input and output ports 480 for the receipt or transmission (including either or both of wired and wireless transmission) of data. The computing system or apparatus 460 may include additional components as provided in the computing architecture 700 illustrated in FIG. 7.

In some embodiments, the computing system or apparatus 460 further includes one or more reconfigurable circuit device 485, which may include an FPGA, a CPLD, or other reconfigurable circuit device, wherein the FPGA is to be programmed with a lightweight digital signature verify engine 490, such as an ECDSA engine, which may include the digital signature verify engine 400 as illustrated in FIG. 4A. In some embodiments, the computing system or apparatus is to utilize the digital signature verify engine 490 to perform operations as illustrated in FIGS. 5, 6A, and 6B.

Figure 5:
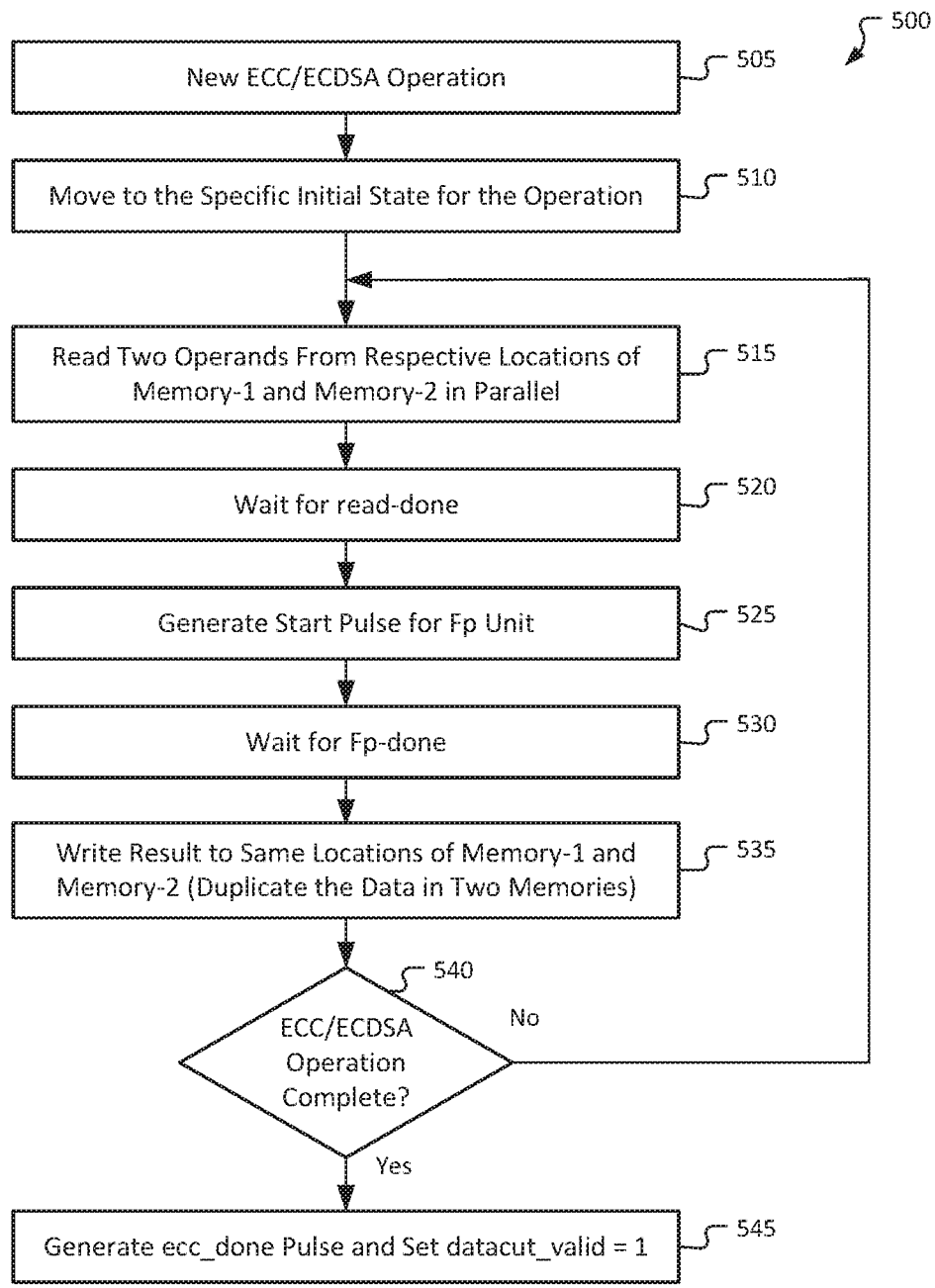
FIG. 5 is a flow chart to illustrate a process for an ECDSA verify operation in a reconfigurable circuit device according to some embodiments.
Figure 6A:
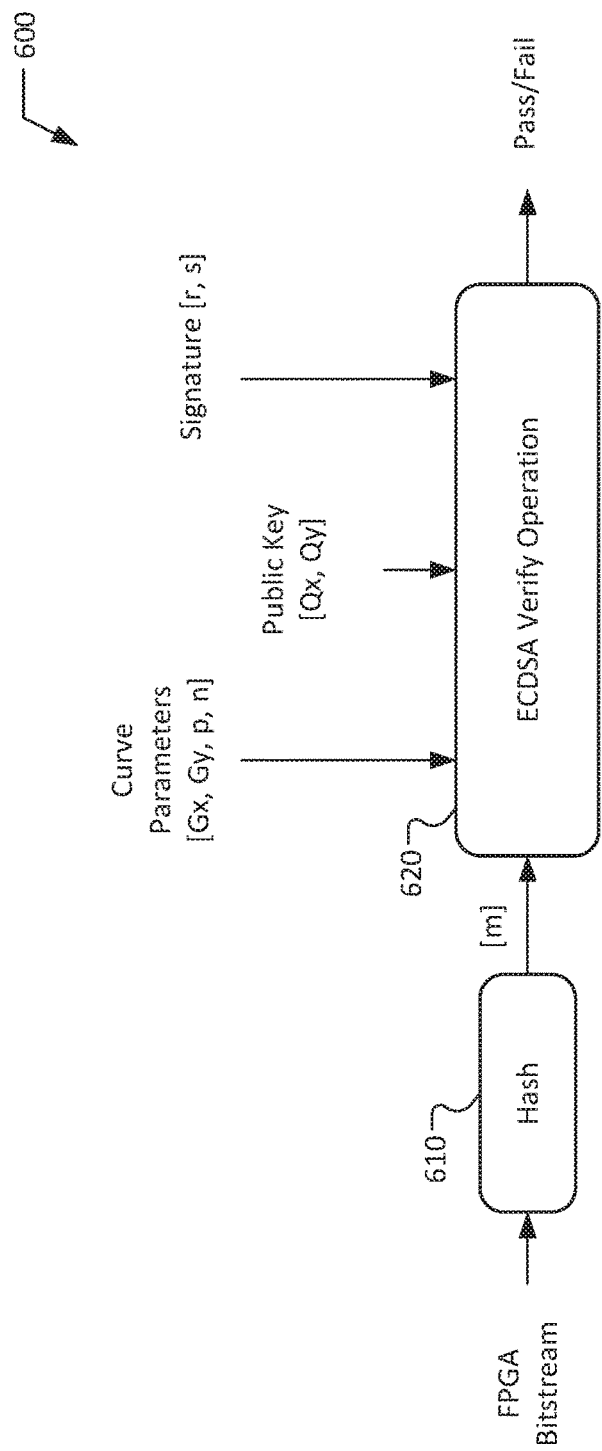
FIG. 6A is an illustration of FPGA bitstream authentication using a lightweight ECDSA engine for a reconfigurable circuit device according to some embodiments.
Figure 6B:
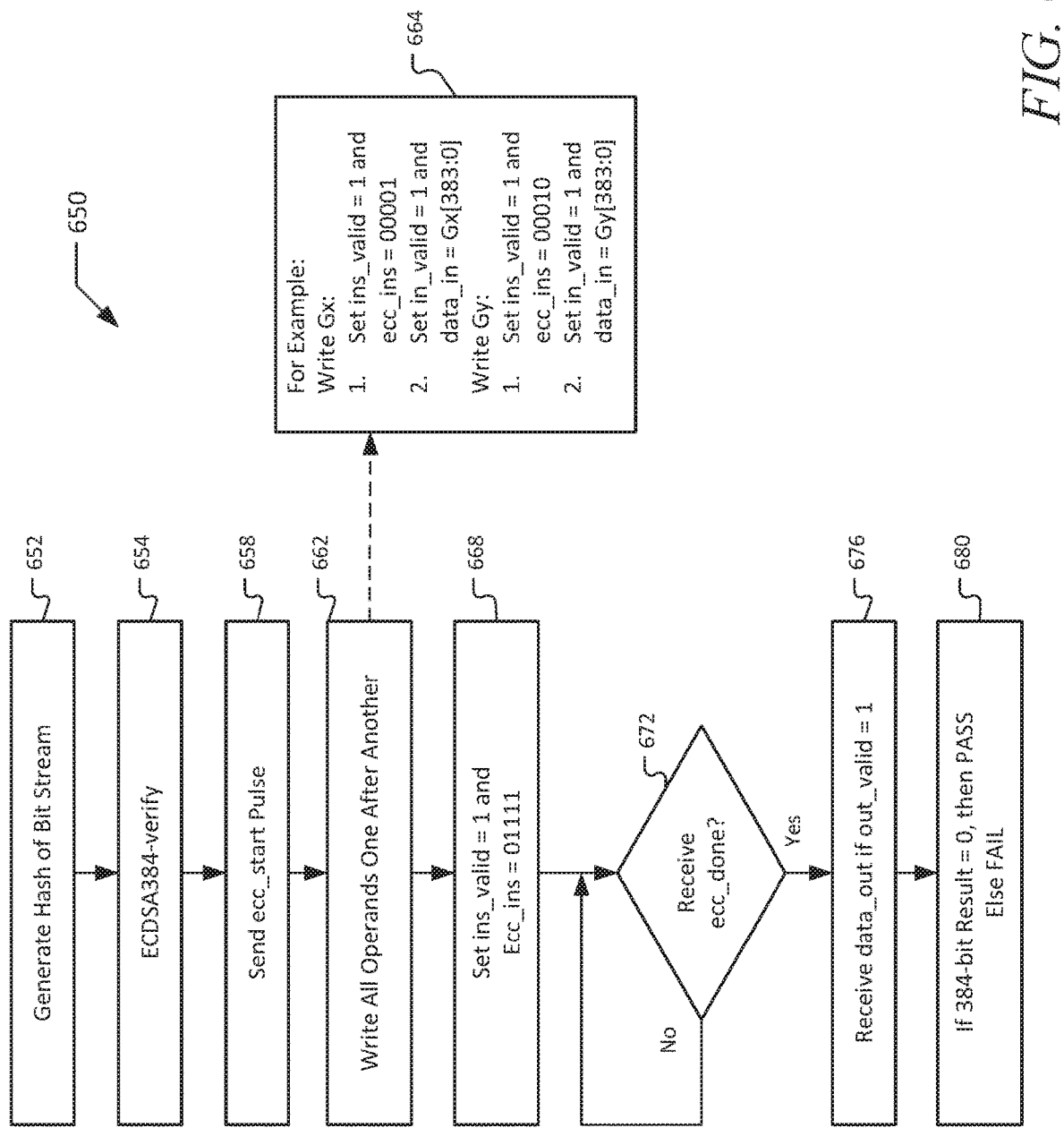
FIG. 6B is a flow chart to illustrate programming flow with an ECDSA hardware engine for a reconfigurable circuit device according to some embodiments.

FIG. 5 is a flow chart to illustrate a process for an ECDSA verify operation in a reconfigurable circuit device according to some embodiments. In some embodiments, a process 500 commences with a new ECC/ECDSA operation 505 in a reconfigurable circuit device such as an FPGA or CPLD. The process then proceeds to the specific initial state for the ECC/ECDSA operation 510.

The process then continues with reading two operands from respective locations in two memories 515, wherein the memories may be Memory-1 and Memory-2 such as the memories illustrated within in the global BRAM 405 in digital signature verify engine 400 as illustrated in FIG. 4A. After waiting for the completion of the reading (read-done) 520, a start pulse for the Fp unit is generated 525 to commence Fp computation, wherein the Fp unit may include the 384-bit Fp-multiplication/addition/subtraction unit 420 as illustrated in FIG. 4A. The process 500 then waits for an Fp-done signal 530 signifying that the computation by the Fp-unit is completed. Upon receiving the Fp-done, the result is written to the same locations of Memory-1 and Memory-2, i.e., duplicate data is written to the two memories 535.

If the ECC/ECDSA operation is not complete 540 (meaning that there are additional operands in memory to be evaluated), the process 500 returns to reading a next two operands from respective locations of Memory-1 and Memory-2 515. Upon completion of the ECC/ECDSA operation 540, an ecc_done pulse is generated (indicating completion of the ECC/ECDSA operation) and datacut_valid is set to be '1' (indicating successful validation by the ECC/ECDSA operation) 545. While this is not illustrated in FIG. 5, if the validation process is not successful, the process will instead proceed to take actions connected with an invalidity finding, such as providing error warnings, marking data as invalid, repeating one or more operations, or other actions. The validation operations are further illustrated in FIGS. 6A and 6B.

FIG. 6A is an illustration of FPGA bitstream authentication using a lightweight ECDSA engine for a reconfigurable circuit device according to some embodiments. In this top level diagram of FPGA bitstream authentication 600, a hash 610 of the full bitstream is first generated, wherein the generation of the hash may be performed outside of the ECSDA hardware engine.

In some embodiments, the resulting hash [m] is provided to an ECDSA verify operation 620 in a reconfigurable circuit device such as an FPGA for signature verification. A signature [r, s], a public key Q [Qx, Qy], and elliptic curve parameters [Gx, Gy, p, n] are programmed into the ECDSA verify operation 620 in the reconfigurable circuit device, with the verify operation resulting in a Pass or Fail determination.

FIG. 6B is a flow chart to illustrate programming flow with an ECDSA hardware engine for a reconfigurable circuit device according to some embodiments. In an ECDSA signature verification process 650 using an ECDSA hardware engine for a reconfigurable circuit device, a hash is initially generated for a bit stream 652. As illustrated in FIG. 6A, the hash of a bit stream for verification may first be generated outside of the ECDSA hardware engine. In some embodiments, the process 650 include receipt of a verification request, illustrated as ECDSA384-verify 654. An ecc_start pulse is then sent 658, followed by all operands being written one after another 662. As shown in the example 664, Gx is written with the processing including setting ins_valid=1 with ecc_ins=00001, and setting in_valid=1 with data)_in=Gx[383:0], and Gy is written with the process including setting ins_valid=1 with ecc_ins=00010, and setting in_valid=1 with data_in=Gy[383:0].

In some embodiments, the process proceeds with setting ins_valid=1 and ecc_ins=01111 (element 668). The process then waits for completion of the ECC, illustrated as the determination whether ecc_done is received 672. Upon receiving the ecc_done signal, the process proceeds with receiving data_out if out_valid=1 676. If 384 bit result=0, then the verification process result is PASS, and otherwise the result is FAIL 680.

Figure 7:
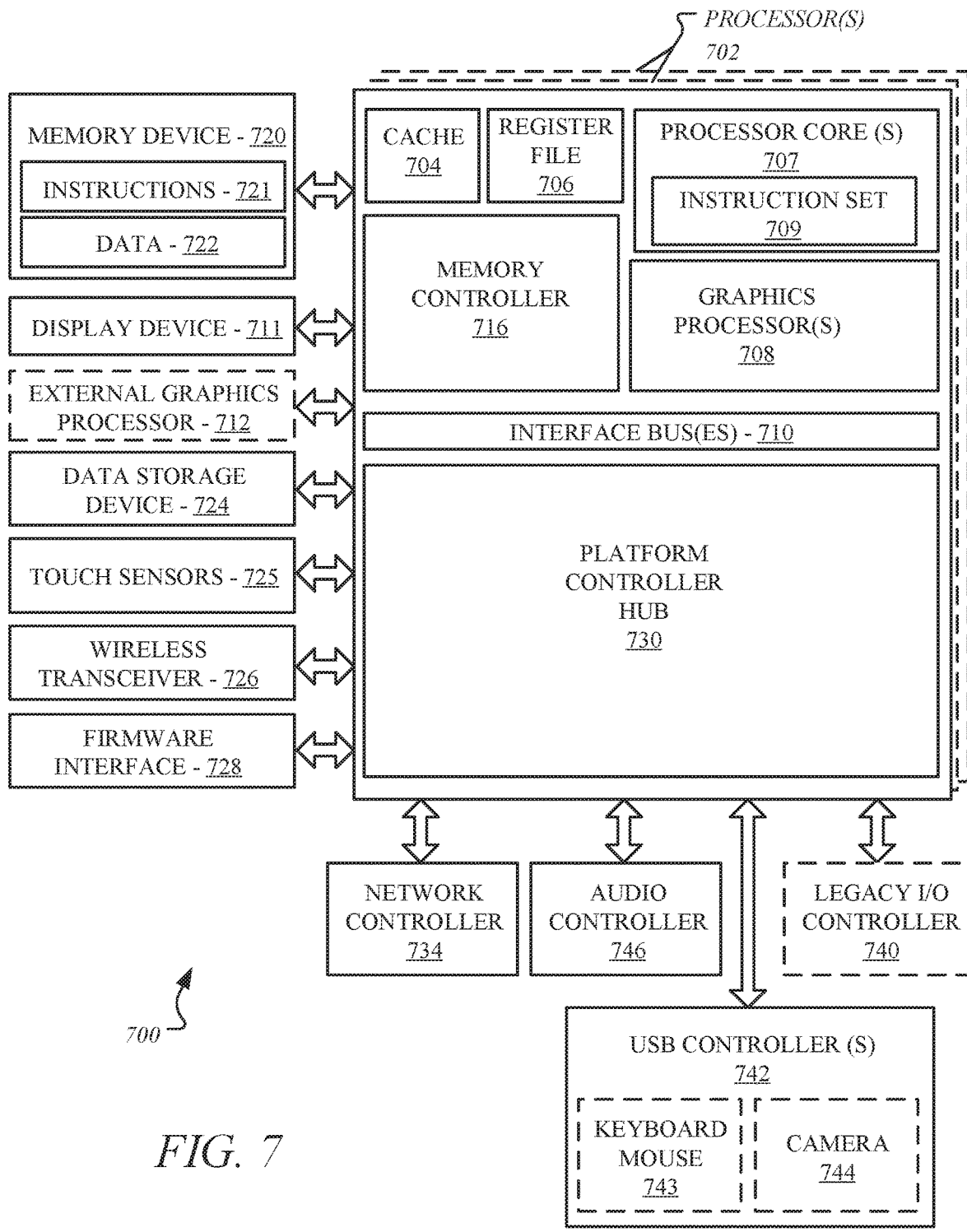
FIG. 7 illustrates an embodiment of an exemplary computing architecture that may be suitable for implementing various embodiments as previously described.

FIG. 7 illustrates an embodiment of an exemplary computing architecture that may be suitable for implementing various embodiments as previously described. The embodiments may include a computing architecture including an reconfigurable circuit device containing an ECC/ECDSA hardware engine, such as illustrated in FIGS. 3 to 6B.

In various embodiments, the computing architecture 700 may comprise or be implemented as part of an electronic device. In some embodiments, the computing architecture 700 may be representative, for example, of a computer system that implements one or more components of the operating environments described above. In some embodiments, computing architecture 700 may be representative of one or more portions or components of a Deep Neural Network (DNN) training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In some embodiments, an apparatus includes one or more processors; and a reconfigurable circuit device, the reconfigurable circuit device including a plurality of digital signal processing (DSP) blocks, and a plurality of logic elements (LEs), wherein the one or more processors are to configure the reconfigurable circuit device to operate as a signature verification engine for a bit stream, the signature verification engine including a hybrid multiplication unit, the hybrid multiplication unit combining a set of the plurality of LEs and a set of the plurality of DSPs to multiply operands for signature verification.

In some embodiments, the reconfigurable circuit device is one of an FPGA (Field Programmable Gate Array) or CPLD (Complex Programmable Logic Device).

In some embodiments, the signature verification engine is an ECDSA (Elliptic Curve Digital Signature Algorithm) engine.

In some embodiments, the hybrid multiplication unit is to iterate a calculation a plurality of times to generate a product of a multiplication operation.

In some embodiments, the hybrid multiplication unit is to perform multiplication for Galois field computations.

In some embodiments, the reconfigurable circuit device further includes a block random access memory (BRAM), and wherein configuring the reconfigurable circuit device to operate as a signature verification engine for a bit stream includes the one or more processors to configure two memory blocks in the BRAM for duplicate data entries.

In some embodiments, the signature verification engine is to receive a hash of a bitstream for verification.

In some embodiments, configuring the reconfigurable circuit device to operate as a signature verification engine for a bit stream includes the one or more processors to provide curve parameters, a public key, and a signature for the signature verification engine.

In some embodiments, one or more non-transitory computer-readable storage mediums having stored thereon executable computer program instructions that, when executed by one or more processors, cause the one or more processors to perform operations comprising configuring a reconfigurable circuit device to operate as a signature verification engine for a bit stream, the reconfigurable circuit device including a plurality of digital signal processing (DSP) blocks and a plurality of logic elements (LEs); generating a hash of a bit stream; and performing a signature verification for the bit stream utilizing the signature verification engine, wherein the signature verification engine includes a hybrid multiplication unit, the hybrid multiplication unit combining a set of the plurality of LEs and a set of the plurality of DSPs to multiply operands for the signature verification.

In some embodiments, the reconfigurable circuit device is one of an FPGA (Field Programmable Gate Array) or CPLD (Complex Programmable Logic Device).

In some embodiments, configuring the reconfigurable circuit device to operate as a signature verification engine for a bit stream includes configuring the reconfigurable circuit device to operate as an ECDSA (Elliptic Curve Digital Signature Algorithm) engine.

In some embodiments, the instructions further include instructions for iterating a calculation a plurality of times with the hybrid multiplication unit to generate a product of a multiplication operation.

In some embodiments, the hybrid multiplication unit is to perform multiplication for Galois field computations.

In some embodiments, the reconfigurable circuit device further includes a block random access memory (BRAM), and wherein configuring the reconfigurable circuit device to operate as a signature verification engine for a bit stream includes configuring two memory blocks in the BRAM for duplicate data entries.

In some embodiments, configuring the reconfigurable circuit device to operate as a signature verification engine for a bit stream includes providing curve parameters, a public key, and a signature for the signature verification engine.

In some embodiments, a computing system includes one or more processors; dynamic random access memory (DRAM) for storage of data; and an FPGA (Field Programmable Gate Array), the FPGA including a block random access memory (BRAM), a plurality of digital signal processing (DSP) blocks, and a plurality of logic elements (LEs), wherein one or more processors are to configure the FPGA as an ECDSA (Elliptic Curve Digital Signature Algorithm) engine for signature verification of a bit stream, the ECDSA engine including a hybrid multiplication unit, the hybrid multiplication unit combining a set of the plurality of LEs and a set of the plurality of DSPs to multiply operands for the signature verification.

In some embodiments, the hybrid multiplication unit is to iterate a calculation a plurality of times to generate a product of a multiplication operation.

In some embodiments, the hybrid multiplication unit is to perform multiplication for Galois field computations.

In some embodiments, configuring the FPGA is an ECDSA engine includes the one or more processors to configure two memory blocks in the BRAM for duplicate data entries.

In some embodiments, configuring the FPGA as an ECDSA engine includes the one or more processors to provides curve parameters, a public key, and a signature for the ECDSA engine.

In some embodiments, a method includes configuring a reconfigurable circuit device to operate as a signature verification engine for a bit stream, the reconfigurable circuit device including a plurality of digital signal processing (DSP) blocks and a plurality of logic elements (LEs); generating a hash of a bit stream; and performing a signature verification for the bit stream utilizing the signature verification engine, wherein the signature verification engine includes a hybrid multiplication unit, the hybrid multiplication unit combining a set of the plurality of LEs and a set of the plurality of DSPs to multiply operands for the signature verification.

In some embodiments, the reconfigurable circuit device is one of an FPGA (Field Programmable Gate Array) or CPLD (Complex Programmable Logic Device).

In some embodiments, configuring the reconfigurable circuit device to operate as a signature verification engine for a bit stream includes configuring the reconfigurable circuit device to operate as an ECDSA (Elliptic Curve Digital Signature Algorithm) engine.

In some embodiments, the method further includes iterating a calculation a plurality of times with the hybrid multiplication unit to generate a product of a multiplication operation.

In some embodiments, the hybrid multiplication unit is to perform multiplication for Galois field computations.

In some embodiments, the reconfigurable circuit device further includes a block random access memory (BRAM), and wherein configuring the reconfigurable circuit device to operate as a signature verification engine for a bit stream includes configuring two memory blocks in the BRAM for duplicate data entries.

In some embodiments, configuring the reconfigurable circuit device to operate as a signature verification engine for a bit stream includes providing curve parameters, a public key, and a signature for the signature verification engine.

In some embodiments, an apparatus includes means for configuring a reconfigurable circuit device to operate as a signature verification engine for a bit stream, the reconfigurable circuit device including a plurality of digital signal processing (DSP) blocks and a plurality of logic elements (LEs); means for generating a hash of a bit stream; and means for performing a signature verification for the bit stream utilizing the signature verification engine, wherein the signature verification engine includes a hybrid multiplication unit, the hybrid multiplication unit combining a set of the plurality of LEs and a set of the plurality of DSPs to multiply operands for the signature verification.

In some embodiments, the reconfigurable circuit device is one of an FPGA (Field Programmable Gate Array) or CPLD (Complex Programmable Logic Device).

In some embodiments, configuring the reconfigurable circuit device to operate as a signature verification engine for a bit stream includes configuring the reconfigurable circuit device to operate as an ECDSA (Elliptic Curve Digital Signature Algorithm) engine.

In some embodiments, the apparatus further includes means for iterating a calculation a plurality of times with the hybrid multiplication unit to generate a product of a multiplication operation.

In some embodiments, the hybrid multiplication unit is to perform multiplication for Galois field computations.

In some embodiments, the reconfigurable circuit device further includes a block random access memory (BRAM), and wherein configuring the reconfigurable circuit device to operate as a signature verification engine for a bit stream includes configuring two memory blocks in the BRAM for duplicate data entries.

In some embodiments, configuring the reconfigurable circuit device to operate as a signature verification engine for a bit stream includes providing curve parameters, a public key, and a signature for the signature verification engine.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
one or more processors; and
a reconfigurable circuit device, the reconfigurable circuit device including:
 a plurality of digital signal processing (DSP) blocks, each DSP block including an integer multiplier circuit,
 a plurality of logic elements (LEs), and
 an embedded memory;
wherein the one or more processors are to configure the reconfigurable circuit device to operate as a digital signature verification engine for a bit stream, the digital signature verification engine including:
 a hybrid multiplication unit, the hybrid multiplication unit combining a set of the plurality of LEs and a set of the plurality of DSP blocks to multiply operands for signature verification, wherein the hybrid multiplication unit is to iterate a portion of a calculation a plurality of times to generate a product of a multiplication operation for a digital signature verification operation, including storing intermediate results of the calculation in the embedded memory.

2. The apparatus of claim 1, wherein the reconfigurable circuit device is one of an FPGA (Field Programmable Gate Array) or CPLD (Complex Programmable Logic Device).

3. The apparatus of claim 1, wherein the digital signature verification engine is an ECDSA (Elliptic Curve Digital Signature Algorithm) engine.

4. The apparatus of claim 3, wherein the hybrid multiplication unit is to perform multiplication for Galois field computations.

5. The apparatus of claim 3, wherein the embedded memory of the reconfigurable circuit device includes a block random access memory (BRAM), and wherein configuring the reconfigurable circuit device to operate as a signature verification engine for a bit stream includes the one or more processors to configure two memory blocks in the BRAM for duplicate data entries.

6. The apparatus of claim 3, wherein the digital signature verification engine is to receive a hash of a bitstream for verification.

7. The apparatus of claim 3, wherein configuring the reconfigurable circuit device to operate as a digital signature verification engine for a bit stream includes the one or more processors to provide curve parameters, a public key, and a signature for the digital signature verification engine.

8. The apparatus of claim 1, wherein the hybrid multiplication unit performs a 384-bit×384-bit multiplication operation.

9. The apparatus of claim 8, wherein each DSP block includes a 9-bit×9-bit multiplier, and wherein the hybrid multiplication unit utilizes 43 DSP blocks to provide a 384-bit×9-bit multiplier to iteratively calculate the 384-bit× 384-bit multiplication operation.

10. One or more non-transitory computer-readable storage mediums having stored thereon executable computer program instructions that, when executed by one or more processors, cause the one or more processors to perform operations comprising:
 configuring a reconfigurable circuit device to operate as a digital signature verification engine for a bit stream, the reconfigurable circuit device including a plurality of digital signal processing (DSP) blocks, each DSP block including an integer multiplier circuit, a plurality of logic elements (LEs), and an embedded memory;
 generating a hash of a bit stream; and
 performing a signature verification for the bit stream utilizing the digital signature verification engine;
wherein the digital signature verification engine includes a hybrid multiplication unit, the hybrid multiplication unit combining a set of the plurality of LEs and a set of the plurality of DSP blocks to multiply operands for the signature verification, and wherein the hybrid multiplication unit is to iterate a portion of a calculation a plurality of times to generate a product of a multiplication operation for a digital signature verification operation, including storing intermediate results of the calculation in the embedded memory.

11. The one or more mediums of claim 10, wherein the reconfigurable circuit device is one of an FPGA (Field Programmable Gate Array) or CPLD (Complex Programmable Logic Device).

12. The one or more mediums of claim 10, wherein configuring the reconfigurable circuit device to operate as a digital signature verification engine for a bit stream includes configuring the reconfigurable circuit device to operate as an ECDSA (Elliptic Curve Digital Signature Algorithm) engine.

13. The one or more mediums of claim 12, wherein the hybrid multiplication unit is to perform multiplication for Galois field computations.

14. The one or more mediums of claim 12, wherein the embedded memory of the reconfigurable circuit device further includes a block random access memory (BRAM), and wherein configuring the reconfigurable circuit device to operate as a signature verification engine for a bit stream includes configuring two memory blocks in the BRAM for duplicate data entries.

15. The one or more mediums of claim 12, wherein configuring the reconfigurable circuit device to operate as a digital signature verification engine for a bit stream includes providing curve parameters, a public key, and a signature for the digital signature verification engine.

16. A computing system comprising:
one or more processors;
dynamic random access memory (DRAM) for storage of data; and
an FPGA (Field Programmable Gate Array), the FPGA including:
 a block random access memory (BRAM),
 a plurality of digital signal processing (DSP) blocks, each DSP block including an integer multiplier circuit, and
 a plurality of logic elements (LEs);
wherein the one or more processors are to configure the FPGA as an ECDSA (Elliptic Curve Digital Signature Algorithm) engine for signature verification of a bit stream, the ECDSA engine including:
 a hybrid multiplication unit, the hybrid multiplication unit combining a set of the plurality of LEs and a set of the plurality of DSP blocks to multiply operands for the signature verification, wherein the hybrid multiplication unit is to iterate a portion of a calculation a plurality of times to generate a product of a multiplication operation for an ECDSA operation, including storing intermediate results of the calculation in the BRAM.

17. The computing system of claim 16, wherein the hybrid multiplication unit is to perform multiplication for Galois field computations.

18. The computing system of claim 16, configuring the FPGA as an ECDSA engine includes the one or more processors to configure two memory blocks in the BRAM for duplicate data entries.

19. The computing system of claim 16, wherein configuring the FPGA as an ECDSA engine includes the one or more processors to curve parameters, a public key, and a signature for the ECDSA engine.

* * * * *